US009569782B1

(12) United States Patent
Lavery et al.

(10) Patent No.: US 9,569,782 B1
(45) Date of Patent: Feb. 14, 2017

(54) AUTOMATED CUSTOMER BUSINESS IMPACT ASSESSMENT UPON PROBLEM SUBMISSION

(71) Applicant: International Business Machines Corporation, Armonk, NY (US)

(72) Inventors: Andrew J. Lavery, Austin, TX (US); Mario A. Maldari, Lyons, CO (US); Susan M. Manupelli, Pepperell, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/867,038

(22) Filed: Sep. 28, 2015

(51) Int. Cl.
*H04M 3/00* (2006.01)
*H04M 5/00* (2006.01)
*G06Q 30/00* (2012.01)
*H04M 3/51* (2006.01)
*G06F 17/28* (2006.01)

(52) U.S. Cl.
CPC .......... *G06Q 30/016* (2013.01); *G06F 17/28* (2013.01); *H04M 3/5183* (2013.01)

(58) Field of Classification Search
CPC  G10L 15/00; G06Q 10/06; H04M 2203/2011; H04M 2203/2061; H04M 2242/00; H04M 2242/08; H04M 2242/12; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191;H04M 3/523; H04M 3/5231; H04M 3/5232; H04M 3/5233; H04M 3/5235; H04M 3/5237; H04M 3/5238
USPC ........... 379/210.01, 265.01, 265.02, 265.03, 379/265.04, 265.05, 265.06, 265.07, 379/265.08, 265.09, 265.1, 265.11, 379/265.12, 265.13, 265.14, 26, 6.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| 4,638,445 | A | * | 1/1987 | Mattaboni | B25J 9/0003 180/168 |
| 5,027,406 | A | * | 6/1991 | Roberts | G10L 15/22 704/244 |
| 7,853,551 | B1 | * | 12/2010 | Gill | G06N 5/04 706/55 |
| 7,900,201 | B1 | | 3/2011 | Qureshi et al. | |
| 8,719,073 | B1 | | 5/2014 | Kirshenbaum et al. | |

(Continued)

OTHER PUBLICATIONS

Menzies et al., "Automated Severity Assessment of Software Defect Reports", ICSM 2008, pp. 346-355.

(Continued)

*Primary Examiner* — Khai N Nguyen
(74) *Attorney, Agent, or Firm* — Michael A. Petrocelli

(57) ABSTRACT

A computer-implemented method and system for automated customer business impact assessment upon a problem submission. A problem description of a problem with a product is received from a customer using the product. The problem description is automatically analyzed using natural language processing (NLP) to identify an issue including a subject. The issue and subject is compared with usage information stored in a repository for the customer. The method and system include predicting an impact of the problem to the (Continued)

customer, and prioritizing a solution to the problem based on the predicted impact.

12 Claims, 4 Drawing Sheets

(56) References Cited

U.S. PATENT DOCUMENTS

| | | | | |
|---|---|---|---|---|
| 8,818,788 | B1* | 8/2014 | Mihalik | G06F 17/2785 |
| | | | | 704/1 |
| 9,336,526 | B2* | 5/2016 | Tuchman | H04M 3/5166 |
| 2002/0038299 | A1* | 3/2002 | Zernik | G06F 17/30017 |
| 2005/0108775 | A1* | 5/2005 | Bachar | G06Q 50/22 |
| | | | | 725/135 |
| 2008/0154625 | A1* | 6/2008 | Serbanescu | G06Q 30/0601 |
| | | | | 705/26.1 |
| 2009/0222313 | A1* | 9/2009 | Kannan | G06Q 30/02 |
| | | | | 705/7.31 |
| 2010/0083029 | A1* | 4/2010 | Erickson | G06F 11/0709 |
| | | | | 714/2 |
| 2010/0106552 | A1* | 4/2010 | Barillaud | G06Q 10/06 |
| | | | | 705/7.14 |
| 2010/0131450 | A1 | 5/2010 | Nguyen et al. | |
| 2012/0246620 | A1 | 9/2012 | Bellucci et al. | |
| 2014/0006292 | A1* | 1/2014 | Kozlovsky | G06Q 30/016 |
| | | | | 705/304 |
| 2014/0052645 | A1 | 2/2014 | Hawes et al. | |
| 2014/0189873 | A1 | 7/2014 | Elder et al. | |
| 2014/0207518 | A1* | 7/2014 | Kannan | G06Q 30/0201 |
| | | | | 705/7.29 |
| 2015/0242860 | A1* | 8/2015 | Kannan | G06Q 30/02 |
| | | | | 705/304 |

OTHER PUBLICATIONS

Matalonga et al., "Automatic Defect Classification: An Experience Applying Natural Language Processing", Proc. CLEI 2009, Pelotas, Brazil, pp. 1-8.
IBM, "Orthogonal Defect Classification", ODC v5.2 for Design & Code, http://researcher.watson.ibm.com/researcher/view_project_subpage.php?id=5020, printed on Jun. 29, 2015, pp. 1-3.

* cited by examiner

AUTOMATED CUSTOMER BUSINESS IMPACT ASSESSMENT UPON PROBLEM SUBMISSION

BACKGROUND

The present disclosure relates to a method and system for computer implemented assessment responsive to a problem submission. For instance, the present disclosure relates to receiving a problem statement about a software application by a software provider or manufacturer, or a support team (e.g., a support group, help desk, or customer service), and generating a priority of the problem for a customer.

Typically, a user of a software application, whether used for an individual or by a corporate entity, can contact a support team (e.g., help desk) when a problem occurs with the software application. The problem can reflect a defect in the software application. It is often difficult for a support team to identify how a particular problem or defect can impact customers and users, and their respective organization if applicable. It also can be difficult for a user to assess the potential impact of a problem in their own organization. For instance, a user may not be aware of the extent of use of a product, or aware of plan to roll out an alternative product.

For example, a user can inform a support team for a software application of an issue or problem, and request assistance in resolving the issue. The resolution can require a significant amount of time for the customer or user, especially when the user or customer is relying on the software application for uses important to their business. Improvements are desirable to improve the user/customer experience (e.g., response time) when experiencing an issue or problem with a product. For example, improvements are desirable in responsiveness to a service call when a customer submits a problem to a support group for a product.

SUMMARY

In one example, it would be beneficial for a resource such as a support team to ascertain an impact to a user or business, or a customer's organization upon submission of a problem statement. For instance, an automatic customer scope impact or priority score can be assigned upon submission of a problem to a support resource. The customer scope impact can reflect the importance of the problem to the customer, and also can reflect the impact the problem can have on the customer organization, and thereby the importance or priority of providing a resolution to the problem. The customer scope impact or priority score can also be reflected in prioritizing the importance of the submitted problem and finding a resolution.

According to an aspect of the present invention, a computer-implemented method for automated customer business impact assessment upon a problem submission is provided. A problem description of a problem with a product is received from a customer using the product. The problem description is automatically analyzed using natural language processing (NLP) to identify an issue including a subject. The issue and subject is compared with usage information stored in a repository for the customer. The method includes predicting an impact of the problem to the customer, and prioritizing a solution to the problem based on the predicted impact.

According to another aspect of the present invention, a computer program product for automated customer business impact assessment upon a problem submission is provided. The computer program product includes a computer readable storage medium having program instructions embodied therewith, wherein the computer readable storage medium is not a transitory signal per se. The program instructions are executable by a computer to cause the computer to perform a method, comprising: receiving a problem description of a problem with a product from a customer using the product; analyzing the problem description automatically using natural language processing (NLP) to identify an issue including a subject; comparing the issue and subject with usage information stored in a repository for the customer; predicting an impact of the problem to the customer; and prioritizing a solution to the problem based on the predicted impact.

According to another aspect of the present invention, a computer system for automated customer business impact assessment upon a problem submission is provided. The computer system includes: one or more computer processors, one or more computer-readable storage media, and program instructions stored on one or more of the computer-readable storage media for execution by at least one of the one or more processors. The program instructions, include: receiving a problem description of a problem with a product from a customer using the product; analyzing the problem description automatically using natural language processing (NLP) to identify an issue including a subject; comparing the issue and subject with usage information stored in a repository for the customer; predicting an impact of the problem to the customer; and prioritizing a solution to the problem based on the predicted impact.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

The present disclosure includes a method and system which provides a real time and automatic customer scope impact, e.g., a business priority score or value, which can be assigned upon submission of a problem or issue with a product, e.g., a software application. This allows for a product team or development/product team, as part of a customer service solution (also can be referred to as a support system or support team solution), to determine the scope of a fix to the problem and the relative importance of the fix. The problem can include a defect in the software application.

Further, the method and system of the present disclosure enables prioritizing problems and issues. Specifically, the support team, in one example a product team responsible for remedying a problem with a software application, can have a better understanding of how a customer is impacted by a problem (e.g., a defect in the software application). A better understanding can result in enhanced quality of service, a remedy, and a better customer experience. Further, the embodiments of the present disclosure enables better use of resources to remedy a problem, for example, time resources, and personnel resource allocation, such as allocating time for personnel to spend on fixing a problem and assigning a quantity of personnel to fix a problem.

Figure 1:
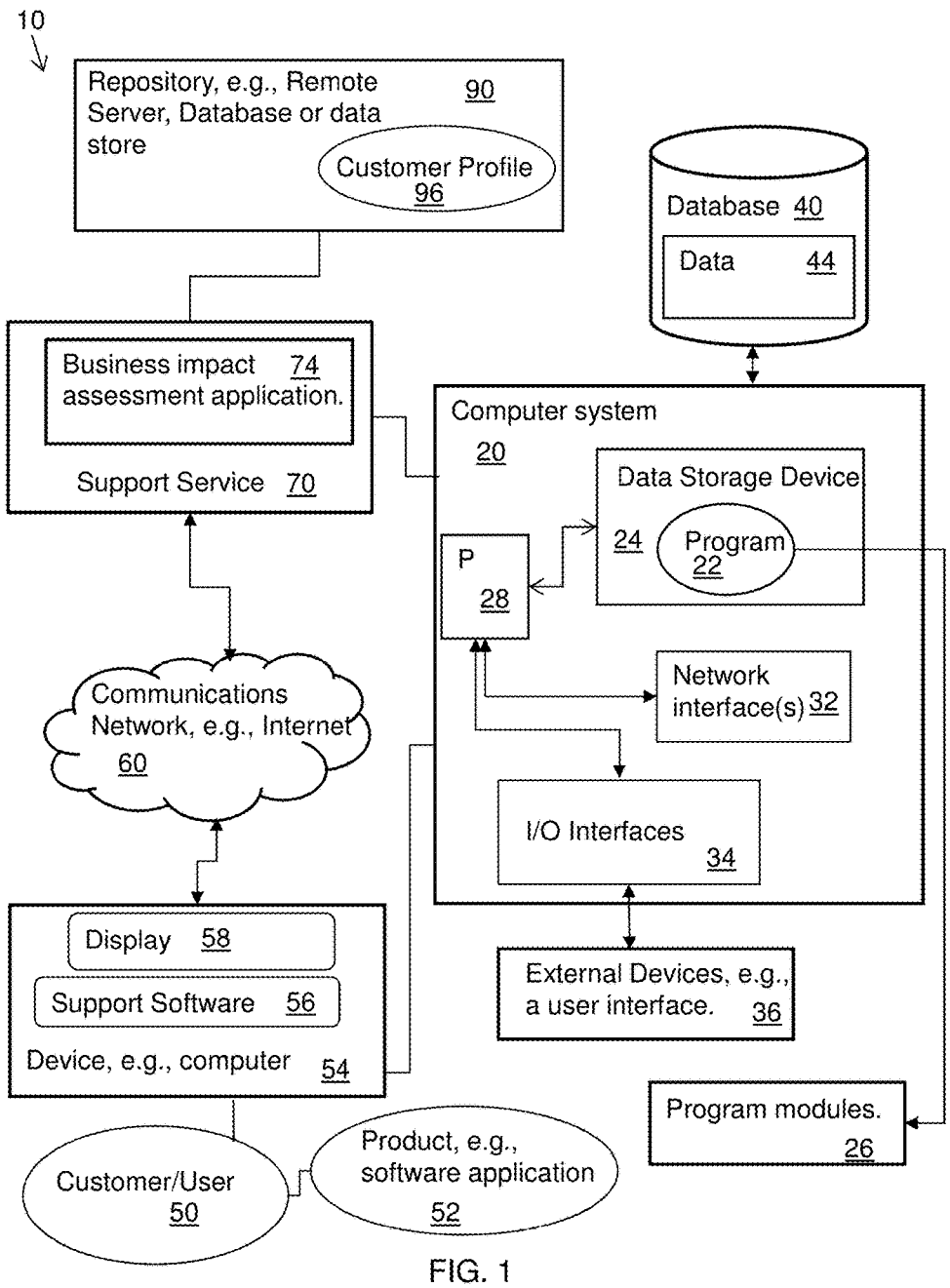
FIG. 1 is a schematic block diagram illustrating an overview of a system and methodology for automated customer business impact assessment according to an embodiment of the disclosure.
Figure 2:
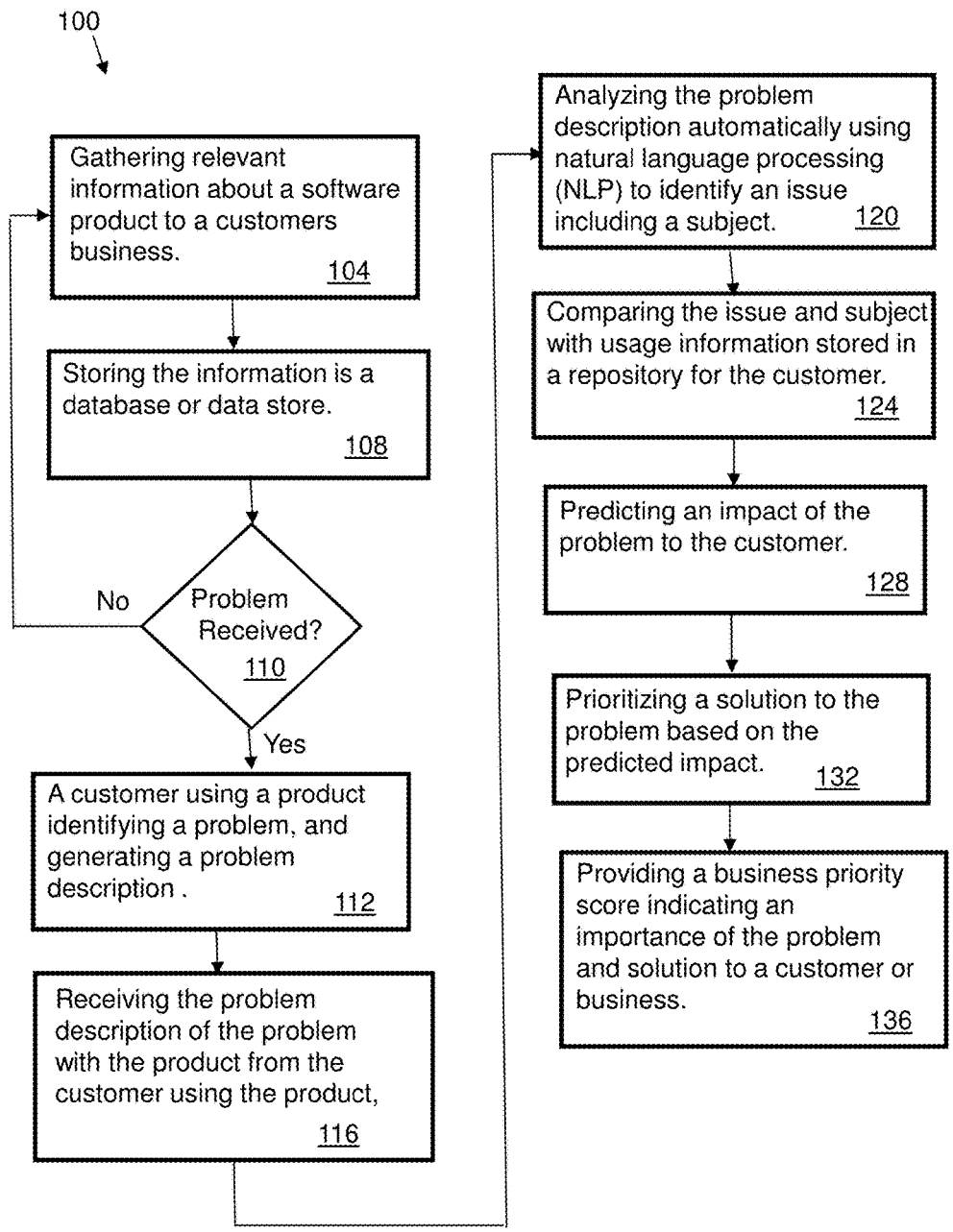
FIG. 2 is a flow chart illustrating a method for automated customer business impact assessment based on the system shown in FIG. 1, according to an embodiment of the disclosure.

Referring to FIGS. 1 and 2, a system 10 and method 100 according to an embodiment of the present disclosure for automated customer business impact assessment upon a problem submission is described. In one example, a problem description of a problem can be submitted to a support service group or a customer service group regarding a product. For example, the support service group can be a product development team. For example, the product can be a software application or a hardware system, such as a hardware component for instance of a computer system. In the embodiment discussed below, for illustrative purposes the product is embodied as a computer program or software application or software application service. Further, the support service group is embodied as a customer service group for supporting the product. Generally, the support service group can broadly different levels of support from a product development team to a help desk model of support. In the present embodiment, the customer service group can include a product development team tasked with remedying a defect to problem in a software application. The method and system of the present disclosure can be used by the customer service group to assess the priority of the problem or defect.

The method 100 includes gathering relevant information by the product provider who is providing service for the product, about the customer, the customer's business, and the product's use and impact on the customer's business, as in block 104. The relevant information can also be provided by the customer, and loaded into a profile for the customer. In the present example, the product is embodied as a software application or program 52, and the product provider is a software provider. The information can be stored in data storage, for example, a database, data store, or a server, as in block 108. The information can be stored in a customer profile. In one example, for a software provider with many customers, each customer can have a profile with information about the customer.

A customer can enter a problem description into an accessible service application or a venue for reporting on a software application, which is accessible by the support service of the product provider. In another example, a customer service call can be received from a customer to a support service provided by the software product provider. When a product problem is received or detected from a customer (block 110), the method proceeds to block 112. If a product problem has not been received or detected (block 110), the method returns to block 104.

The method 100 includes a customer 50 using a product, embodied as a software application 52, identifying a problem 204 and generating a problem description 206, as in block 112. The customer can access a support software program 56 (also referred to as a support program) to describe the problem in detail. It is understood that the support software program 56 is accessed using a computer device with a display, in this example, a customer computer 54 and display 58. The client support software can be a client based software designed to interact with a provider support software. Alternatively, a client interface can be provided which is accessed as a service using a communications network, (e.g., the Internet). Alternatively, the customer can also contact a support service by calling in (e.g., telephone) and a customer service representative entering a problem description described by the customer or a customer's representative.

The method includes receiving the problem description 206 of the problem 204 regarding the product 52 from the customer 50 using the product 52, as in block 116. The problem description can be received by a support service 211 (e.g., customer support group or team) for the product provider 210 (e.g., product manufacturer, or service provider). The support service 211 can access a provider support software program 220 (also referred to as a support program). The provider support software 220 can be used to access the received problem description and to add to the problem description by inquiry with the customer or by accessible data about the customer. It is understood that the provider support software 220 can be accessed using a computer device with a display, in this example, a support service computer 212 having a display 214.

The method 100 includes analyzing 230 the problem description automatically using natural language processing (NLP) to identify an issue 232 including a subject 234, as in block 120.

The issue and subject are compared with usage information stored in a repository for the customer, as in block 124. A profile can be created for the customer that includes the usage information. A plurality of profiles can be created for each of a multiplicity of customers. The plurality of customers can form a customer base for a product provider.

The method includes predicting an impact of the problem to the customer, as in block 128. The prediction can be accomplished using analytics.

The predicted impact can be advantageous, for example, for a support team to identify how a particular problem or defect can impact customers and users, and their respective organization. It can also be advantageous, for example, for a user to assess the potential impact of a problem in their own organization.

For example, a user who submits a defect to a support team from a company may not be aware of strategic business policies when they submit a defect. For example, if a company plans a major role out of a new database product in the next year, and an entry level employees finds one or more problems on the new product, they may have logged the problem as a minor defect(s) because their current product deployed is a different database product (and they may or may not be aware of the planned switch). However, the logged as minor defects of the yet to be implemented database product could have strategic issues and/or result in strategic impediments to the new database product roll out. The automatic assessment to provide a predicted impact according to the embodiments of the present disclosure incorporates the importance of the issue (as described above) from the stored information (for example, a profile), and an appropriate priority can be assigned to the problem and solution.

I think that one of the best examples is something like a strategic deployment strategy. Like the DB2 example above. Thereby, information stored (such as in a profile) about a company or user can be used in assessing a priority score. In the example described above, the priority score would be higher based on the planned implementation of a new product.

In another example, a feature can be provided which supports auditability. For example, a review and approval feature according to the embodiments of the present disclosure could save information and initiate an assessment or check between the problem description and the information, resulting in an assignment of a priority score. The review and approval feature can include a history of when the product was reviewed and approved and the history about and surround those events. This feature could be particularly useful for product providers where approval and regulatory approvals are required. The analysis could include key words or phrases in the problem description which is compared to keyword in a customer repository, information file, or profile. A problem or defect reported relating to an approval or regulation (or regulation issue) can be assigned a high priority. The assessment and priority score can be assigned automatically when the problem description is submitted.

Referring to FIG. 2, a solution to the problem is prioritized based on the predicted impact, as in block 132. The method and system of the present disclosure can determine a business priority score based on the prioritization of the problem and solution to the problem, and provide the business priority score indicating an importance of the problem and solution to a customer or business (block 136). In the embodiment shown in FIG. 3, the business priority score is shown as a product provider business priority score 222. In another example, a customer can generate their own business priority score for their particular business which is embodied as customer business priority score 242.

In another example, the support service for the product can have a product provider business priority score which is related to all customers using their product, e.g., their customer base. The support service for the product can also have a customer business priority score which reflects the customer who submitted the problem. Thus, the support service can reference a product provider business priority score indicating the priority to their customer base, and a customer business priority score indicating the priority to the customer who submitted the problem.

As mentioned above, a profile can be created for one or more customers. The profile can include customer information gathered by automation, and analytics, or by user input. In another example, artificial intelligence can be used to build a profile and to predict the impact of a problem on a user's or customer's business. The profile can be stored in a repository. The information includes determining usage information related to the customer. The profile usage information stored in the profile, can include, one or more of: business priorities, importance of the product to the business, and one or more related platforms used with the product. The usage information can also include one or more of: a business usage, a product usage, a service usage, one or more business priorities, and a business goal.

As discussed above, more specifically, a problem description can be submitted to a customer service department 211 of a software provider 210 or software service provider. The repository 90 can includes profiles 96 for a plurality of customers 50 forming a customer base for the product. Each of the profiles includes the usage information regarding each of the customers, respectively. The method and system of the present disclosure further includes comparing the issue and subject with the usage information for each of the customers. Using the comparison, the method can predict the impact of the problem to the customers collectively, or individually. The method can prioritize the solution to the problem based on the predicted impact to the customer base, or to an individual customer. A business priority score, embodied as product provider business priority score 222 is related to the customer base based on the prioritization of the solution to the problem. The business priority score indicates an important of the solution to the customer base. Alternatively, the business priority score can be embodied as a customer business priority score and is related to a customer and based on the prioritization of a solution to the problem for the customer.

In the embodiments of the present disclosure, one or more users can enter information that is relevant and important to their business. Alternately, the information may be collected from tools that can analyze the customer's environment and use patterns. For example, a software issue can be part of a software platform (such as a database platform). Other information can include software features, usage by the user, or user work flows. The information can be entered into a data store to be cross referenced when a problem or defect is submitted. The information can be considered the customer's profile, and include important information to the customer, in other words, what the customer considers important information. When a problem or defect is submitted by the user/customer, the problem identification (e.g., a problem ticket in a help desk solution team) can automatically receive a customer scope and business priority value or score based on keywords and fields in the problem or defect record. The business priority value will help determine the impact to the product's customer base and allow a development team to assess the importance of delivering a fix, for example, in a release cycle.

In addition to this cross reference of the customer's profile data store to determine priority, the embodiments of the present disclosure enable technologies including cognitive computing systems to use natural language processing tools that can scan the textual entry of the defect, and correlate the verbiage to determine a customer impact. Furthermore, cognitive computing system or other tools can examine log files. Metadata, and other artifacts submitted with the defect to further assess the scope and priority of the defect. This combined with a cross reference of a data store containing important business information makes for a powerful combination of analysis that can help customers determine impact with certainty and ease.

In one example, the present disclosure can be applied to a customer support system such as a help desk ticketing system.

The method and system of the present disclosure can enter a profile for the user, access the customer's preferences and priorities and rate the trouble ticket with a customer impact and business priority. Additionally, monitoring systems, such as a performance management software can detect problems and find events (which can initiate opening trouble tickets). Problems identified by the monitoring system can be rated as discussed above based on the information available in the event description and one or more profiles for the customer.

Thus, the method and system of the present disclosure can use Natural Language Processing (NLP) to assist in analyzing information in a software problem submittal (e.g., change request). The information can be compared to a datastore that has usage data including of importance to the business of a particular customer. Based on the above, a severity and business priority is automatically assigned to the problem submittal/change request, affectively reducing subjectivity of the submitter and aligning the problem with the important aspects of the business to provide a priority score particular to the customer's business.

Figure 3:
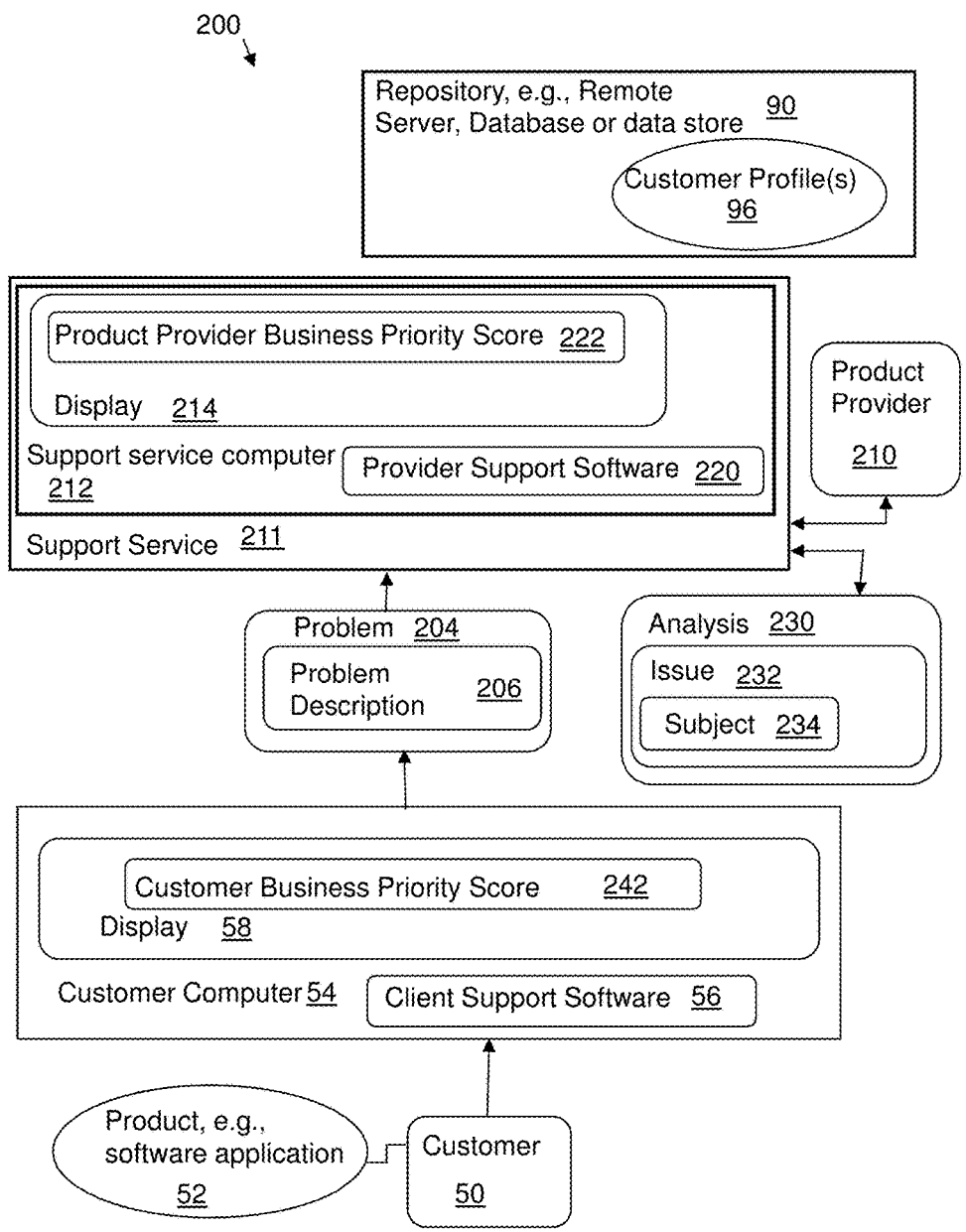
FIG. 3 is a functional block diagram depicting a system for automated customer business impact assessment according to the method and system shown in FIGS. 1 and 2, according to an embodiment of the disclosure.
Figure 4:
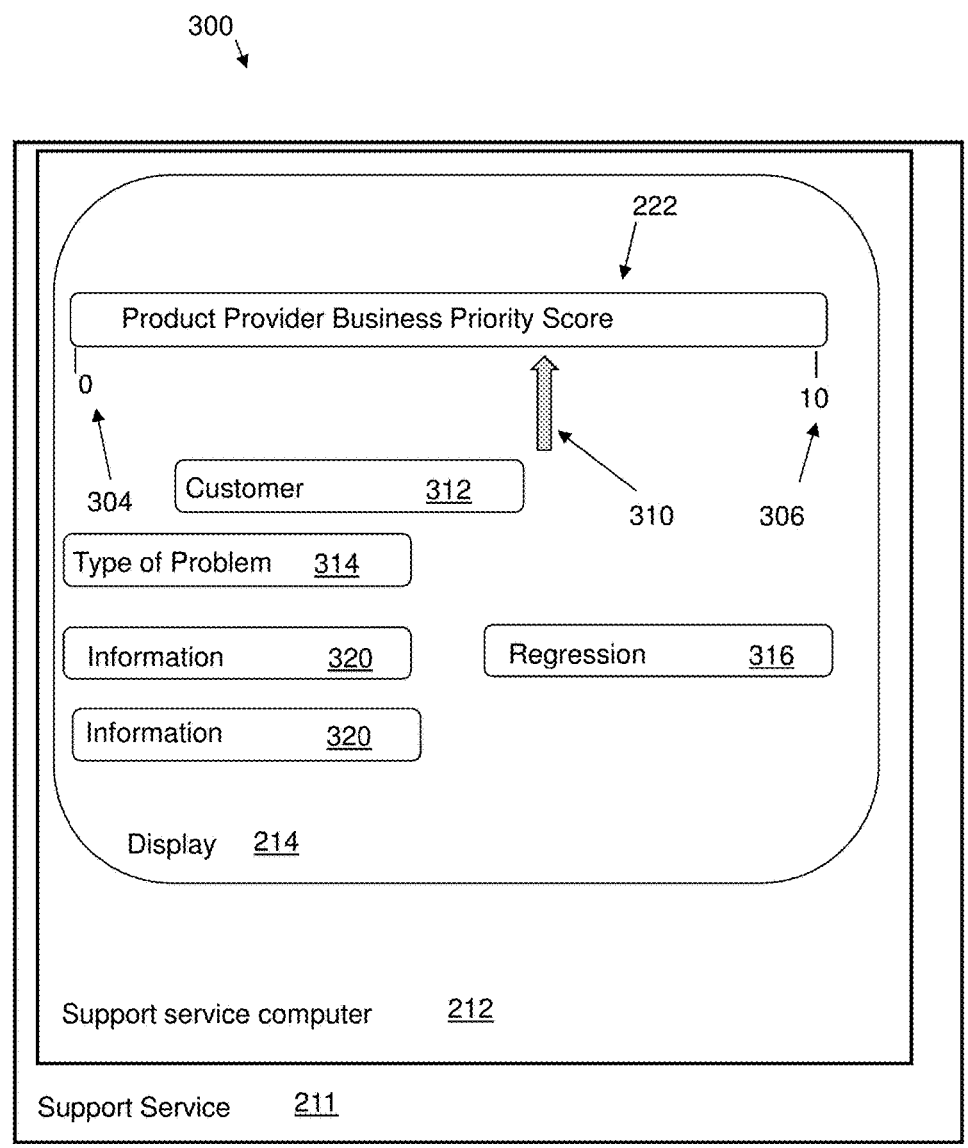
FIG. 4 is a schematic block diagram depicting an embodiment of a display with reference to the system and method shown in FIGS. 1-3 and according to an embodiment of the disclosure.

Referring to FIGS. 1 and 3, a system 10 and method 200 according to another embodiment of the present disclosure for automated customer business impact assessment upon a problem submission for a software application is described.

The method includes gathering relevant information from one or more users or customers, as in block 104. The information being relevant to a product, e.g., a software application, or a hardware component or system, regarding a customer's business. The relevant information includes, for example, a user's topology and usage model, important functions, and critical use case flows. The information is stored in a remote server, data store, or database 90 which includes repository 90 of the information, as in block 108.

When a service call, for example, submitting a problem or defect is submitted to a support service 70, a cross reference is initiated with the database for the customer information which can include a customer profile 96. The cross reference can use keywords to check in the description (and other fields) of the problem description against a customer database. The cross reference can also include using natural language processing techniques to analyze all log files and other artifacts submitted with the problem description. When multiple keywords and field matches are matched the a customer business priority score or value can be assigned. In general, the more matches the higher the score, which indicates a higher risk to a service providers customer base.

Thereby, the embodiments of the present disclosure provide a system and method for assessing the severity of a problem or defect and assigning a priority for a solution to a support team. One advantage of the present embodiments is directed to a updatable profile or information store about a customer and their use of a product, containing information (e.g., usage information) about the user or customer of a product. Using stored information about the customer or user eliminates the need for a subjective opinion of an importance of the product to a customer or user. For example, instead of a user providing an opinion of the importance of a product their organization and potentially the importance of a solution to a problem, the method of the present disclosure assesses the problem description and issues, and provides a priority of a solution using the stored information.

In one embodiment, a user or customer can enter information, e.g., usage information, of subjective importance into a datastore or database. The information can include for a software product, software platforms, and hardware features. The customer can submit a problem or defect during normal product usage. When engaged, the business impact assessment application 74 can reference the database using natural language processing (e.g., detecting words, for example, "Must" or "should") and cross references a problem description with the usage information. The application 74 assigns an impact (e.g., priority score) to the problem or defect automatically based on customer's subjective usage information (which can be a combination of data store cross reference and language processing). The customer can determine an action to remedy the problem or defect based on the priority score.

In another embodiment, a plurality of customers can enter problems and problem descriptions or defect descriptions in a repository that is not controlled by the customer, or, alternatively, can be managed by an in-house administrator. The customer's perceived impact or a problem or defect may be different than the party receiving the defect, such as a service group for a product provider. In one example, an on-line forum may be available for customers of a product to comment and seek answers to questions. This type of repository can be open to customers to log defects regarding one or more product of a manufacturer or product provider. The customer may log a defect that they may not perceive as having a high impact. For example, a minor flaw in a database, or database feature. When the product provider receives the defect, they can have a set of rules that also analyzes business impact. In one example, a particular problem that the customer reported and reported as having a low or no impact to them individually, could have impact to the providers other customers, and could indicate a widespread issue. In this case, the problem or defect (using techniques of cross checking a datastore and language processing), can be indicated deemed to have a very high business impact for the product provider. In one example, a business priority score can be provided for the product provider (e.g., their customer base), and a business priority score can be provided for the specific customer.

Advantages of the method and system of the present disclosure include, reducing the risk of regressions based on the inclusion of unnecessary (low customer impact) fixes or defect fixes. The method and system of the present disclosure can also increase efficiency pertaining to identifying and remedying a problem before the problem becomes a larger problem, and thereby can save the product provider or developer in their costs to maintain a product. Further, a software developer or provider can improve their overall quality of product, service and customer experience, for example, by identifying and remedying targeted fixes for the product's specified customer base. Additionally, the method and system of the present disclosure can enable a product developer and provider to pro-actively engage support and be rapidly prepare to handle a defect that can affect a large numbers of customers of the product by not only identifying a defect but in appropriately responding to a problem or defect with an appropriate urgency and resources.

Thus, the method and system of the present disclosure provides individualized assessment of customer impact upon defect submission, so that each customer's profile (which can include priorities, needs, etc.) is considered to rate how much the issue affects the customer. The assessment can be standardized across customers so that the customer impact value is normalized across the customers, and that impact number can be compared across the customers. One advantage of the method and system of the present disclosure is that a product provider, (e.g., a software provider, supplier, service organization) can gauge the business priority of every defect that is at issue. In one example, the business priority for a product provider is not the same as the customer impact, or customer business impact. For instance, a security issue may be low impact to one customer, but have a high business priority for the product provider.

In one example, a system 300 for displaying a business priority score or value can include a display 214 of a software service computer 212 at a support service 211 of a product provider 210 is shown having a problem reporting input screen of a business impact assessment application 74. A product provider business priority score 222 has a scale of '0' 304 to '10' 306. An indicator 310 shows the business priority value or score for the problem using the method and system of the present disclosure. The indicator 310 can vary as the information (e.g., problem description) is entered and updated, and a prediction of impact is ascertained as in the embodiments of the present disclosure. Information can be inputted in fields, such as a customer name 312, and a type of problem 314. Other information fields 320 can receive usage information and can be inputted in the on-screen application.

In one example, the priority score 222 can start with an empty defect, and thus a resulting priority score is zero 304. As information is entered in the description fields, the priority score can respond and move in real-time. In one embodiment the priority score can be estimated based on keywords, and field selections. In another embodiment, analytics can be used to analyze non-structured strings.

The business impact assessment software application 74 can determine a percentage of customers utilizing a feature, and factor in data collected around the relative importance of the feature. An initial score can then be calculated.

As information is entered in the fields, the software compares the problem description with the data about the business, and assesses the importance of the information compared to the problem and adjusts the priority score.

In one example, a regression field 316 can identify a version of software used by a customer. For example, the software version may not be widely used by customers such that the majority of the product provider's customers would not be affected by the problem/defect. In this situation, the priority score would be lower, or become lower, in contrast to if a large amount of the customer base used the version of software.

Other information fields can indicate the operating system for a software product. The priority score is adjusted as information is entered. The details related to OS are filled in and the score continues to be tweaked. The detail that is provided in the defect has a direct impact on the accuracy of the score.

Some information fields can require additional analytics pertaining to the relevancy of the information in the field. For example, if an operating system is identified by a customer identifying a defect with a software product, other operating systems can also be affected. The extent of the impact on other operating systems and the severity can be determined or approximated. As more information about the problem or defect is the defect description is filled in, and compared to keywords and information in a profile, natural language processing can be used, and for example, a query and answer system can be used.

Thereby, the present disclosure produces a priority score which reflects the impact of the problem or defect to a customer or a customer base. For example, the higher the score, the more customers will be impacted and the higher the priority of the defect. For example, a defect that results in some sort of data loss or crash, that affects the majority of customers in a customer base should have a higher priority score than a usability problem or defect affecting the same number of customers. Thus, the method and system of the present disclosure enables the use of NLP as a tool to determine a priority and assign a priority score to a customer problem. The priority score is determined by cross referencing it with a centralized database that represents each customer and their subjective priorities.

In one example, the method and system of the present disclosure applies natural language processing techniques to gather information from the customer submitted problem report. The information is cross referenced (e.g., compared) with a customer priority database or a profile stored on a database. The customer priority database or profile can be specific to the priorities and needs of the customer. Based on the comparison, a priority score is determined for each customer indicating a priority to provide a resolution to the problem based on each customer's needs.

For example, a customer may use a software application that is critical to their business, while another customer uses a software application in a non-critical manner. The customer who uses the software application for critical business purposes would have a high priority score for fixing a problem, as opposed to the customer who uses the same software for non-critical purposes.

The method and system of the present disclosure provides the benefit of providing an instantaneous/automatic customer scope impact or priority score assigned to a problem submitted. In one example, a product team can determine the scope of a fix to a problem and the relative importance of the fix, and thus be able to prioritize problems or defects. In addition, the method and system of the present disclosure helps ensure that time and resources are not wasted on addressing issues with little to no customer impact, and resources are applied to addressing issues that have the greatest impact to a customer or customer base.

Thus, in one example, the method and system of the present disclosure is beneficial for a support team or resource to ascertain an impact to a user or customer's organization. For instance, an automatic customer scope impact or priority score can be assigned upon submission of a problem to a support resource. The customer scope impact can reflect the importance of the problem to the customer, and also can reflect the impact the problem and its resolution can have on the customer organization. The customer scope impact can also be reflected in prioritizing the importance of the submitted problem and finding a resolution.

The device 54 includes a computer system 20. The device 54 can be a computer or a mobile device, or other types of computer devices. The device 54 can access a support service 70 using a communications network 60 (e.g., the Internet). The computer system 20 is a generic representation of a computer which may be embodied in a device such as a server for providing the method of the present disclosure as a service which can be accessible using the Internet or a network. A business impact assessment application 74 embodying the method of the present disclosure can be embodied as a software application included on a device having a computer system 20 illustrated generally in FIG. 1. A program 22 generically represent a program which can be embodied as the business impact assessment application 74. The application 74 can be a separate application as shown in FIG. 1, and alternatively can be part (or integral with) of another application. The method can also be provided as a service which can be remote, for instance, including an application residing on a remote server exemplified by remote server 90.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 90 which is accessed using the communications network 60.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer-implemented method for automated customer business impact assessment upon receiving a problem description, comprising:
   receiving, using a service computer, the problem description of a problem with a product from a customer using the product on a customer computer, the problem being related to a product selected from a group consisting of: a software application, a hardware system, and a hardware component of a computer system;
   analyzing the problem description automatically using natural language processing (NLP) to identify an issue including a subject, using the service computer;
   comparing the issue and subject with usage information stored in a repository for the customer, the repository comprising a data storage system, wherein the problem description is submitted to a support service of the customer, and the repository includes a profile for the customer, and the profile includes the usage information regarding the customer;
   predicting an impact of the problem to the customer;
   prioritizing a solution to the problem based on the predicted impact;
   comparing the issue and subject with the usage information for the customer;
   prioritizing the solution to the problem based on the predicted impact to the customer; and
   determining a business priority score for the problem in relation to the customer based on the prioritization of the solution to the problem, the business priority score indicating an importance of the solution to a business of the customer.

2. The method of claim 1, wherein the business is a customer or a product provider.

3. The method of claim 1, further comprising:
   creating a profile for the customer and storing the profile in the repository; and
   determining the usage information related to the customer, the profile usage information being stored in the profile, the usage information including, one or more of: business priorities, importance of the product to the business, and one or more related platforms used with the product.

4. The method of claim 1, wherein the usage information includes one or more of: a business usage, a product usage, a service usage, one or more business priorities, and a business goal.

5. The method of claim 1, wherein the problem description is submitted to a customer service or a support service group.

6. The method of claim 1, wherein the repository includes profiles for a plurality of customers, each of the profiles including information regarding each of the customer, respectively.

7. The method of claim 1, wherein the problem description is submitted to a customer service department of a software provider or software service provider, the repository includes profiles for a plurality of customers forming a customer base for the product, each of the profiles including the usage information regarding each of the customers, respectively; and the method further comprising:
   comparing the issue and subject with the usage information for each of the customers;
   predicting the impact of the problem to the customers collectively;
   prioritizing the solution to the problem based on the predicted impact to the customer base; and
   determining a business priority score for the problem in relation to the customer base based on the prioritization of the solution to the problem, the business priority score indicating an importance of the solution to the customer base.

8. The method of claim 1, wherein the repository includes one or more of: a data store or a database.

9. A computer program product for automated customer business impact assessment upon receiving a problem description, the computer program product comprising a computer readable storage medium having program instructions embodied therewith, wherein the computer readable storage medium is not a transitory signal per se, the program instructions executable by a computer to cause the computer to perform a method, comprising:
   receiving, using a service computer, the problem description of a problem with a product from a customer using the product on a customer computer, the problem being related to a product selected from a group consisting of:

a software application, a hardware system, and a hardware component of a computer system;

analyzing the problem description automatically using natural language processing (NLP) to identify an issue including a subject, using the service computer;

comparing the issue and subject with usage information stored in a repository for the customer, the repository comprising a data storage system, wherein the problem description is submitted to a support service of the customer, and the repository includes a profile for the customer, and the profile includes the usage information regarding the customer;

predicting an impact of the problem to the customer;

prioritizing a solution to the problem based on the predicted impact;

comparing the issue and subject with the usage information for the customer;

prioritizing the solution to the problem based on the predicted impact to the customer; and determining a business priority score for the problem in relation to the customer based on the prioritization of the solution to the problem, the business priority score indicating an importance of the solution to a business of the customer.

10. The computer program product of claim 9, further comprising:

creating a profile for the customer and storing the profile in the repository; and determining the usage information related to the customer, the profile usage information being stored in the profile, the usage information including, one or more of: business priorities, importance of the product to the business, and one or more related platforms used with the product.

11. The computer program product of claim 9, wherein the problem description is submitted to a customer service department of a software provider or software service provider, the repository includes profiles for a plurality of customers forming a customer base for the product, each of the profiles including the usage information regarding each of the customers, respectively; and the method further comprising:

comparing the issue and subject with the usage information for each of the customers;

predicting the impact of the problem to the customers collectively;

prioritizing the solution to the problem based on the predicted impact to the customer base; and determining a business priority score for the problem in relation to the customer base based on the prioritization of the solution to the problem, the business priority score indicating an importance of the solution to the customer base.

12. A computer system for automated customer business impact assessment upon receiving a problem description, the computer system comprising:

one or more computer processors, one or more computer-readable storage media, and program instructions stored on one or more of the computer-readable storage media for execution by at least one of the one or more processors, the program instructions, comprising:

receiving, using a service computer, the problem description of a problem with a product from a customer using the product on a customer computer, the problem being related to a product selected from a group consisting of: a software application, a hardware system, and a hardware component of a computer system;

analyzing the problem description automatically using natural language processing (NLP) to identify an issue including a subject, using the service computer;

comparing the issue and subject with usage information stored in a repository for the customer, the repository comprising a data storage system, wherein the problem description is submitted to a support service of the customer, and the repository includes a profile for the customer, and the profile includes the usage information regarding the customer;

predicting an impact of the problem to the customer;

prioritizing a solution to the problem based on the predicted impact;

comparing the issue and subject with the usage information for the customer;

prioritizing the solution to the problem based on the predicted impact to the customer; and determining a business priority score for the problem in relation to the customer based on the prioritization of the solution to the problem, the business priority score indicating an importance of the solution to a business of the customer.

* * * * *